United States Patent [19]

Royster

[11] 4,382,106

[45] May 3, 1983

[54] HONEYCOMB PANEL WITH CONFORMABLE SURFACE

[75] Inventor: William V. Royster, Crete, Ill.

[73] Assignee: International Honeycomb Corporation, Park Forest South, Ill.

[21] Appl. No.: 299,723

[22] Filed: Sep. 8, 1981

[51] Int. Cl.³ .............................................. B32B 3/12
[52] U.S. Cl. ..................................... 428/40; 428/116; 428/119; 220/447
[58] Field of Search ......................... 428/116, 40, 119; 248/205 A; 220/447

[56] References Cited

U.S. PATENT DOCUMENTS

| | | | |
|---|---|---|---|
| 3,211,253 | 10/1965 | Gonzalez | 428/116 |
| 3,261,126 | 7/1966 | Marks | 248/205 A |
| 3,283,888 | 11/1966 | Scott | 428/64 |
| 3,311,338 | 3/1967 | Culley | 248/205 A |
| 3,344,973 | 10/1967 | Studen | 428/116 X |
| 3,753,843 | 8/1973 | Hutchison | 428/116 |

Primary Examiner—Marion McCamish
Assistant Examiner—E. Rollins Buffalow
Attorney, Agent, or Firm—Dressler, Goldsmith, Shore, Sutker & Milnamow, Ltd.

[57] ABSTRACT

A self adhering spacer block or panel formed of honeycomb material is adopted to be conformable to the shape of an object that it confronts. The panel includes a central core of honeycomb material having vertically extending columns with open ends. A first facing member overlies and is secured to one end of the columns. A second facing member overlies and is secured to the opposite end of the columns. At least one of the facing members has a layer of resilient material that is deformable primarily within the thickness of the layer to enable the facing member to conform to curves or irregularities in the shape of the object. A pressure-sensitive adhesive coating overlies the layer of resilient material and has an exposed surface adopted for use in securing the panel to the object.

5 Claims, 3 Drawing Figures

HONEYCOMB PANEL WITH CONFORMABLE SURFACE

TECHNICAL FIELD OF THE INVENTION

This invention relates to a spacer block formed of a panel of honeycomb material. In the particular embodiments to be described and illustrated, at least one of the surfaces of the panel is formed of a relatively resilient material that is adapted to substantially conform to the shape of an object that is positioned against the panel.

BACKGROUND OF THE INVENTION

Self-adhering spacer blocks or panels are useful for a number of purposes. The spacer blocks are provided with a pressure-sensitive adhesive coating on at least one face, and are positioned about a product to prevent damage to the product while it is moved within the factory to various manufacturing steps, and to prevent damage when the product is shipped out of the factory.

Conventional self-adhering spacer blocks are formed of a generally planar, rigid material such as Styrofoam. Other spacer blocks are formed of honeycomb materials which are extremely strong and have a very high strength-to-weight ratio compared to other materials on the market.

The term "honeycomb" is derived from the mass of hexagonal cells of wax built by honey bees and the term is used to refer to a pattern resembling that of a honeycomb. The honeycomb material is made from a relatively high density kraft paper, but can also be made of recycled paper, plastic, or other suitable materials. The material is arranged in a generally hexagonal pattern that resembles a honeycomb, and also has a generally flat top facing layer and bottom facing layer. The honeycomb material in the hexagonal configuration has a high column strength that results in the loads being carried by the honeycomb material being distributed over a series of braced columns. The honeycomb material is also extremely crush resistant.

Conventional honeycomb panels have a central core with vertically extending columns that define cells with open ends, and a pair of opposing generally planar facing layers of relatively rigid material that overlie and are adhesively secured to the ends of the columns. The rigid facing layers are made from various suitable materials ranging from thin metal sheets, such as aluminum or steel, to lighter materials such as kraft linerboard, heavy plastic, or plywood.

The honeycomb panel can be provided with a pressure-sensitive adhesive coating on at least one face to define a self-adhering spacer block or panel.

One of the problems with spacer blocks having at least one planar and rigid face that is coated with pressure-sensitive adhesive is that they may not present a sufficient area of contact to grip and hold a product that has a curved or irregular surface, such as dimples or corrugations.

The rigidity of conventional spacer blocks is also disadvantageous in that the spacer block will not deform to accommodate curves or irregularities in the configuration of the product that confronts the spacer block. When the spacer block has rigid faces that are unyielding in the direction normal to the plane of the faces, the projecting portions of the product can break when pressed against the strong and rigid spacer block, thereby damaging or destroying the product.

Another problem with spacer blocks having rigid faces is the tendency to scratch or mar the surface of the products that they abut against.

One attempt to overcome these problems is disclosed in commonly assigned United States patent application Ser. No. 201,148, filed Oct. 27, 1980 now abandoned. That application discloses a panel of honeycomb material having a flexible surface that is deformable within the voids that are defined by the honeycomb cell walls to accommodate irregularities in the product configuration. Thus, a portion of the object becomes positioned between the planes of the opposing facing layers of the honeycomb panel. The foregoing arrangement has a column strength that is somewhat reduced as compared to a panel having opposing facing layers that are both formed of a rigid material.

SUMMARY OF THE INVENTION

The foregoing disadvantages of the prior art are overcome in accordance with the present invention in which a self-adhering spacer block is formed of a panel of honeycomb material that has opposing facing layers, with at least one of the facing layers having a layer of relatively soft and resilient material to enable the panel to conform to the shape of an object positioned against the panel.

More particularly, the panel has a central core of honeycomb material having vertically extending columns with open ends. A first facing means overlies and is adhesively secured to one end of the columns, and a second facing means overlies and is adhesively secured to the other end of the columns. At least one of the facing means has a layer of resilient material that is positioned outside the central core and is deformable primarily within the thickness of the layer to enable the facing means to conform to the shape of an object that is placed against it. The resilient layer may be formed of rubber-like materials, felt, relatively soft foams, or other suitable materials.

It is a feature of the present invention that localized depressions can be formed in the layer of resilient material to accommodate curves or other irregularities in the configuration of a product that is positioned against the panel. This will lessen instances of product breakage that occur with panels having rigid facing layers, and provide improved holding action between the panel and the object because the area of contact therebetween is increased.

It is another advantage of this invention that self-adhering blocks formed of honeycomb material are relatively inexpensive and are high in strength.

In one of the embodiments of this invention, the layer of resilient material is secured directly to the end of the vertical columns of honeycomb material. As a result, there is a savings in material and manufacturing costs by eliminating at least one of the rigid facing layers, reducing the amount of adhesive that is required, and simplifying the process of manufacturing the panels.

DETAILED DESCRIPTION OF THE PREFERRED EMBODIMENTS

Figure 1:
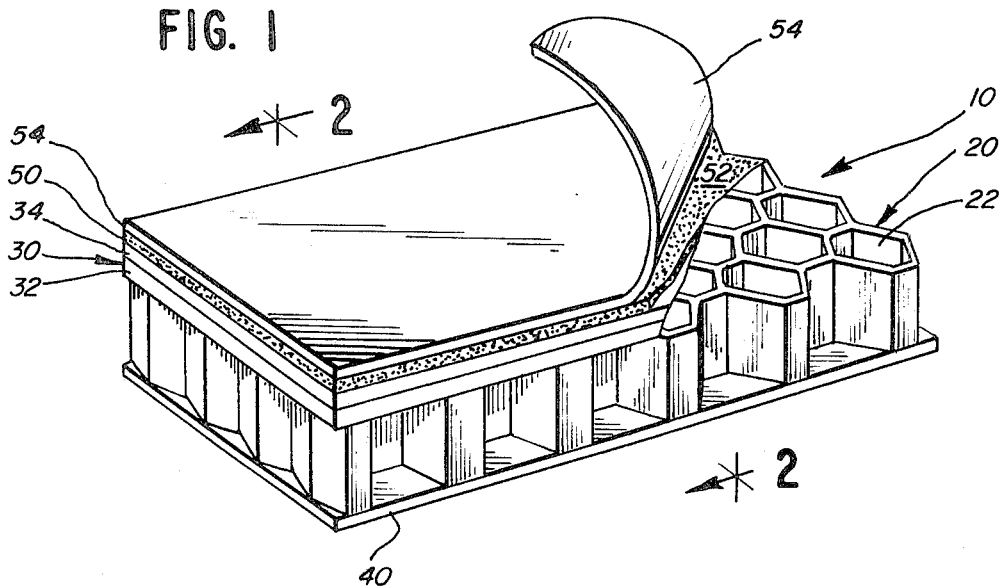
FIG. 1 is a perspective view of a panel of honeycomb material in accordance with the present invention, partially cut away to show interior detail.

While this invention is susceptible of embodiment in many different forms, there is shown in the drawing and will herein be described in detail the preferred embodiments of the invention, with the understanding that the present disclosure is to be considered as an exemplification of the principles of the present invention and is not intended to limit the invention to the embodiments illustrated.

Referring to FIG. 1, a spacer block or panel 10 in accordance with the present invention includes a central core 20 of honeycomb material having vertically extending columns with open ends. A top facing means 30 overlies and is adhesively secured to the upper end of the columns. A bottom facing means 40 is positioned beneath and overlies the lower end of the columns and is adhesively secured thereto.

Figure 2:
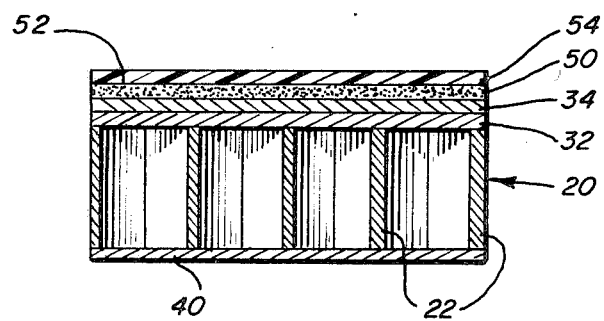
FIG. 2 is an enlarged cross-sectional view taken along line 2—2 in FIG. 1.

The core 20 preferably is formed of a light-weight paper honeycomb material that is made up of a relatively high density kraft paper. The honeycomb material preferably is formed from a continuous piece of kraft paper that is arranged to define cells having vertically extending walls 22 (FIGS. 1 and 2). The adjoining portions of the vertical cells are adhesively secured together. The securement of the ends of the cell walls 22 to the facing means 30 and 40 substantially restrains the cell walls against lateral movement to provide a structure that has high beam strength and is highly crush resistant.

Referring to FIGS. 1 and 2, the bottom facing means 40 comprises a conventional, relatively rigid facing layer that may be formed of kraft paper or other rigid materials, such as thin metal sheets of aluminum or steel, or lighter materials such as plywood or plastic sheets. Although not shown in the drawing, a protective coating may be applied to the outer surface of the facing means 40 to prevent the rigid facing layer from scratching whatever object is positioned against it. The protective coating may comprise a polyethylene film, a soft felt-like material, a nonwoven airlaid fabric, wax coatings, or other suitable materials.

Because of the strength and low cost of honeycomb panels, they are used for many purposes, such as packaging. For many of these uses, including packaging, it would be advantageous to have at least one face of the panel comformable to the shape of the product that is resting against the honeycomb panel.

In accordance with the present invention, at least one of the facing means has a layer of resilient material that is soft, flexible and compressible in order to substantially conform to the shape of a product that confronts the facing layer.

In the embodiment illustrated in FIGS. 1 and 2, facing means 30 comprises a facing layer 32 formed of kraft paper or other rigid materials, similar to facing means 40. In addition, facing means 30 has a layer of resilient material 34 having a predetermined thickness. The resilient material 34 is deformable in the Z direction, normal to the plane of the layer of resilient material. The resilient material is deformable primarily within the thickness of the layer 34, and preferably is deformable substantially entirely within the thickness of the layer 34 and outside the central core 20. Facing layer 32 preferably is essentially non-deformable.

As a result, the layer of resilient material is adapted to be exposed and define an outside layer for confronting an object such as a product the layer of resilient material will compress and is adapted to form localized depressions to accommodate the curves and irregularities in the configuration of an object that is positioned against it. In this manner, there is a significantly greater area of contact between facing means 30 and a product that has a curved or irregular surface, such as dimples or corrugations, as compared to the area of contact between such a product and a panel having a relatively rigid and planar facing means. A stronger hold, with minimal undesirable slippage that could result in scratching or breaking of the product, is therefore achieved with the panel of the present invention.

Suitable materials for use as the layer of resilient material 34 include rubber-like materials, felt, relatively soft foams, and other deformable materials. For example, a foam material for use with this invention can have a thickness between about 1/16 inch and ¼ inch, preferably between about ⅛ inch.

As shown in FIGS. 1 and 2, one face of the layer of resilient material 34 overlies and is adhesively secured to the outside surface of the facing layer 32. The opposite face of the layer of resilient material is covered by a pressure-sensitive adhesive coating 50. The adhesive coating 50 overlies the layer 34 and has an exposed surface 52 adapted for use in securing the panel to an object. The adhesive coating can be formed of any suitable materials, such as hot molt adhesives.

For convenience, temporary protective means 54 may be releasably attached to the exposed surface 52 of the pressure-sensitive adhesive coating 50 to protect the adhesive coating until it is ready for use. The release means is readily separable from the adhesive coating, as shown in FIG. 1, to make the pressure-sensitive adhesive coating suitable for use in securing the panel 10 to the surface of an object. The release means may comprise a material, such as paper having a silicone release compound that forms a coating on one surface of the material.

If desired, the facing layer 32, the layer of resilient material 34, pressure-sensitive adhesive coating 50 and release means 54 can be formed as a sub-assembly that is adhesively secured to one end of the vertical columns 22 of the honeycomb panel.

Figure 3:
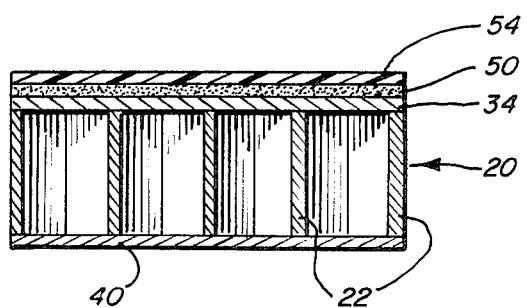
FIG. 3 is a cross-sectional view, similar to FIG. 2, showing another embodiment of the present invention.

The embodiment illustrated in FIG. 3 is similar to the foregoing embodiment, except that the layer of resilient material 34 overlies and is secured directly to one end of the vertical columns 22. This eliminates the separate facing layer 32 and reduces the cost of the materials for manufacturing the panels.

With respect to both of the embodiments, a layer of resilient material can be associated with both of the facing means 30 and 40 of the panel, if desired. In this manner, the panel can conform to the shape of curved or irregular surfaces on opposite sides of the panel.

From the foregoing, it will be observed that numerous variations and modifications may be effected without departing from the true spirit and scope of the novel concept of the invention. It is to be understood that no limitations with respect to the specific structure illustrated herein is intended or should be inferred. It is, of course, intended to cover by the appended claims all such modifications that fall within the scope of the invention.

What is claimed is:

1. A self-adhering panel of honeycomb material that is conformable to the shape of an object, comprising:

a central core of honeycomb material having vertically extending columns that define apertures with open ends, first facing means comprising a paper strip overlying and secured to one end of said columns, second facing means overlying and secured to the other end of said columns, a layer of resilient material secured to said paper strip on the side opposite to said honeycomb material and deformable primarily within the thickness thereof to enable it to conform to the shape of said object, a pressure-sensitive adhesive coating overlying said layer of resilient material and having an exposed surface adapted for use in securing said panel to said object, and a temporary protective means releasably attached to the exposed surface of said pressure-sensitive adhesive coating, and being separable from said pressure-sensitive adhesive coating to make the coating available for use in securing the panel to the object.

2. A panel as defined in claim 1 wherein said protective means comprises a material having a silicone release compound forming a coating on one surface of the material.

3. A panel as defined in claim 1 wherein said layer of resilient material has a thickness between about 1/16 inch and about ¼ inch.

4. A panel as defined in claim 1 wherein said layer of resilient material comprises a relatively soft foam material.

5. A panel as defined in claim 1 wherein said layer of resilient material is deformable substantially entirely within the thickness of said layer.

* * * * *